United States Patent [19]
Nagano et al.

[11] Patent Number: 6,025,956
[45] Date of Patent: *Feb. 15, 2000

[54] INCIDENT-LIGHT FLUORESCENCE MICROSCOPE

[75] Inventors: Takashi Nagano, Tokyo; Keiji Shimizu, Fussa; Kenji Kawasaki, Musashimurayama; Kiyonobu Kurata; Masakazu Shimada, both of Hachioji, all of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/766,132

[22] Filed: Dec. 16, 1996

[30] Foreign Application Priority Data

Dec. 26, 1995 [JP] Japan ..................... 7-338963

[51] Int. Cl.$^7$ ..................... G02B 21/06
[52] U.S. Cl. ................ 359/386; 359/368; 359/370; 359/634
[58] Field of Search .................... 359/368–372, 359/385–388, 494–499, 590, 629, 634, 636

[56] References Cited

U.S. PATENT DOCUMENTS

| | | | |
|---|---|---|---|
| 4,200,353 | 4/1980 | Hoffman | 359/371 |
| 5,371,624 | 12/1994 | Nagano et al. | 359/371 |
| 5,710,663 | 1/1998 | Kawasaki | 359/371 |

FOREIGN PATENT DOCUMENTS

| | | | |
|---|---|---|---|
| 2 010 540 | 12/1970 | Germany | 359/385 |
| 50-2841 | 1/1975 | Japan . | |
| 51-128548 | 11/1976 | Japan . | |
| 56-32116 | 4/1981 | Japan | 359/385 |
| 60-420 | 1/1985 | Japan | 359/385 |
| 5-257066 | 10/1993 | Japan | 359/386 |
| 6-331894 | 12/1994 | Japan . | |

*Primary Examiner*—Thong Nguyen
*Attorney, Agent, or Firm*—Frishauf, Holtz, Goodman, Langer & Chick, P.C.

[57] ABSTRACT

An incident-light fluorescence microscope including: (i) a transmission illuminating optical system which has a first optical member for receiving light emitted from a light source and extracting transmitted light and which irradiates the transmitted light onto a sample, and (ii) an observation optical system which has an objective lens and a second optical member and which is positioned closer to the objective lens than the sample. An incident-light fluorescence illuminating optical system is provided in the observation optical system, wherein the first optical member has a peak of transmittance at a wavelength longer than the fluorescent wavelength, and the second optical member selectively modulates only a wavelength transmitted through the first optical member.

27 Claims, 12 Drawing Sheets

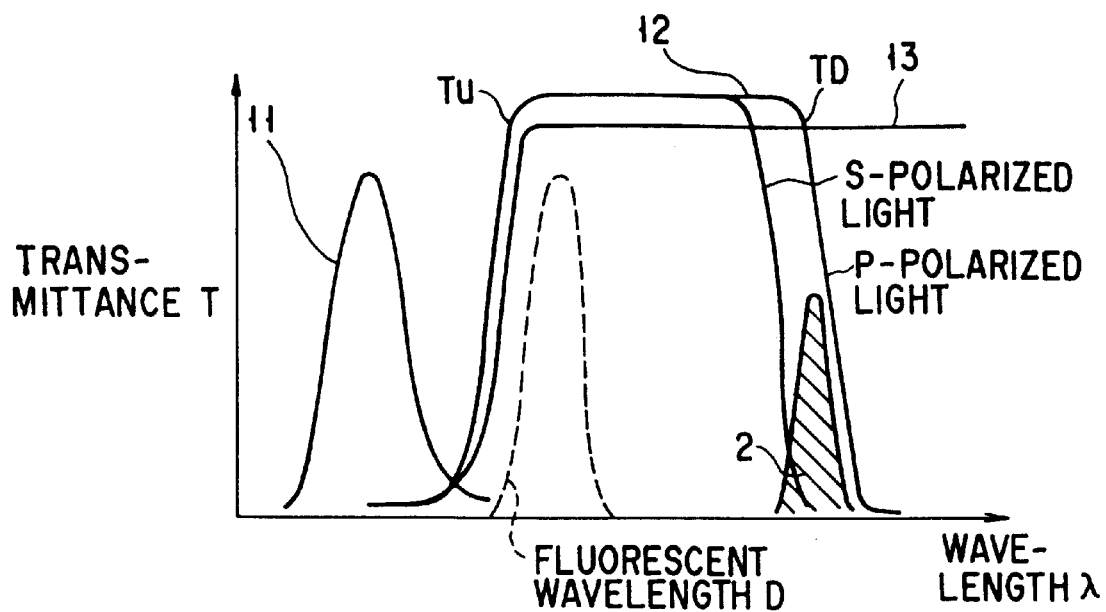
F I G. 2A
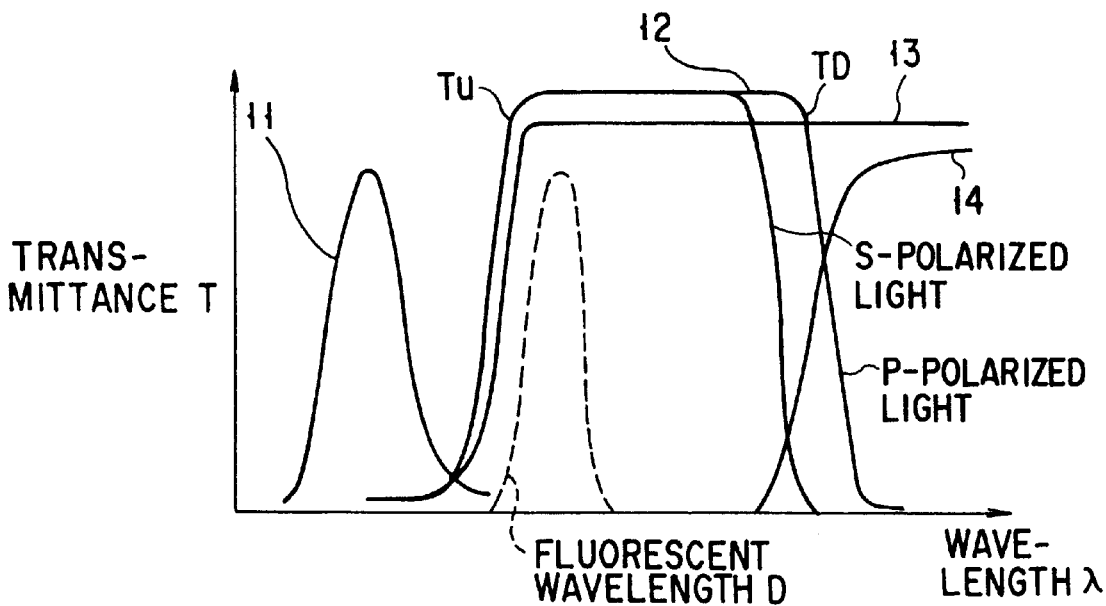
F I G. 2B

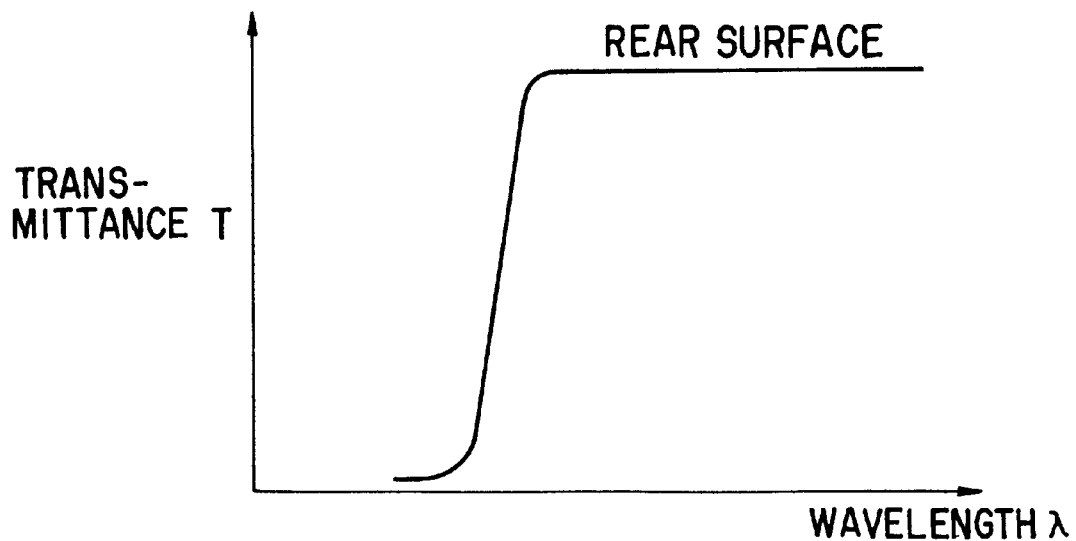
F I G. 3A
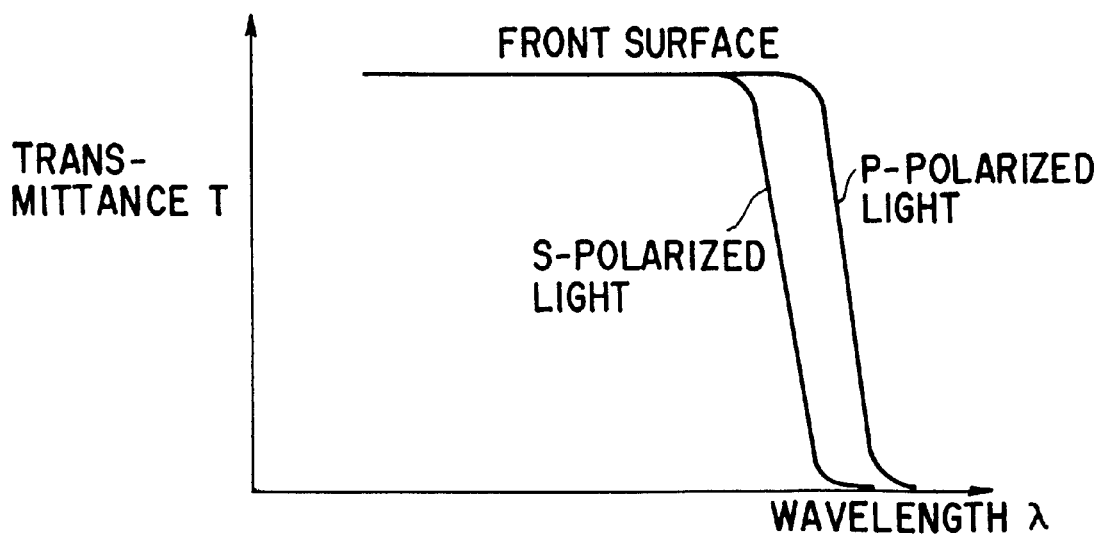
F I G. 3B

INCIDENT-LIGHT FLUORESCENCE MICROSCOPE

BACKGROUND OF THE INVENTION

The present invention relates to an incident-light fluorescence microscope used in observation of the state of a cell or a tissue in the fields of medicine and biology. The present invention particularly relates to an incident-light fluorescence microscope by which the contour of a cell or a tissue is observed by a differential interference observation method or a pupil modulation microscopic method using a modulation contrast (Hoffman modulation contrast) microscope and at the same time the position of, e.g., a substance is detected by an incident-light fluorescence observation method.

The first conventional technique will be described below. Generally, fluorescence microscopes are extensively used in various fields such as medicine and biology to detect, e.g., a fluorescence-labelled protein or gene in a living tissue or cell. Especially in recently years, it is becoming possible to detect the contour of a cell or a tissue by a differential interference observation method and at the same time to detect a fluorescence-labelled protein or gene by an incident-light fluorescence observation method, thereby checking the position of the protein or gene in the cell or tissue.

Unfortunately, in order to simultaneously perform the differential interference observation and the incident-light fluorescence observation, it is necessary to arrange an analyzer (polarizing plate) in the observation optical system, and the light amount loss increases because light passes through this analyzer. This is particularly a problem since a fluorescent image is formed with very weak light. Therefore, intense excitation light must be irradiated on a sample in order to obtain necessary fluorescence. If this is the case, however, fluorescence photobleaching occurs earlier and the sample may be damaged if it is alive.

To solve these problems, the arrangement of a microscope using polarization and the transmittance characteristic of a dichroic mirror which depends upon wavelength and which is capable of simultaneously performing the differential interference observation and the incident-light fluorescence observation is disclosed in "OPTICAL MICROSCOPY FOR BIOLOGY" (Proceeding of The International Conference on Video Microscopy Held in Chapel Hill, N.C. Jun. 4–7, 1989: A JOHN WILEY & SONS, INC., PUBLICATION: Brian Herman, Ken Jacobson), pages 513 to 522. In this arrangement, a dichroic mirror has a function as an analyzer (polarizing plate) only in a specific wavelength region. Since the transmittance is high at wavelengths longer than the specific wavelength, the fluorescent image in this wavelength region does not darken. Accordingly, the differential interference observation and the incident-light fluorescence observation can be simultaneously performed with a high efficiency.

The second conventional technique will be described below. Recently, it is becoming possible to detect the state of a cell or a tissue by a pupil modulation microscopic method using, e.g., a modulation contrast microscope and at the same time detect a fluorescence-labelled protein or gene by the incident-light fluorescence observation method, thereby checking the position of the protein or gene in the cell or tissue and also checking the movement of the protein or gene.

FIG. 12A shows an arrangement disclosed in Jpn. Pat. Appln. KOKAI Publication No. 51-128548 which is obtained by adding elements for modulation contrast observation to a common microscope. As shown in FIG. 12A, a modulator 102 is arranged on the exit pupil plane of an objective lens 103. This modulator 102 is a filter having regions with three different transmittances as shown in FIG. 12B. In this filter, reference numeral 108 denotes a dark portion (D) which transmits almost no light; 109, a gray portion (G) with a transmittance of approximately 15%; and 110, a bright portion (B) which completely transmits light.

A slit 106 is arranged on the front focal plane of a condenser 105. P1 added to one side of the slit 106 and P2 arranged below P1 are polarizing plates. The quantity of light transmitted through the slit 106 can be controlled by rotating the polarizing plate P2. Also, the exit pupil plane of the lens 103 on which the modulator 102 is arranged and the front focal plane of the condenser 105 on which the slit 106 is arranged are conjugated. Accordingly, an image of the slit 106 is formed on the surface of the modulator 102.

Similar to adjusting a ring slit of a phase contrast microscope to a ring of a phase plate, an operator previously adjusts the slit image to the gray portion (G) 109 on the modulator 102 while monitoring the modulator 102 on the exit pupil plane of the objective lens 103 by using a telescope.

FIG. 13 shows a process in which light transmitted through a transparent phase object forms an image with contrast via a modulator. This principle was announced by R. Hoffman and L. Gross in 1975.

Assume that a transparent sample 115 having a phase distribution forms the shape of a prism as shown in FIG. 13. When light rays passed through the slit 117 and condensed into parallel light rays by a condenser 116 enter this prism, a light ray passing through the inclined portion on the left side of FIG. 13 bends to the left from the incident light rays, and a light ray passing through the inclined portion on the right side of FIG. 13 bends to the right from the incident light rays. A light ray passing through a central portion of the prism where the upper and lower surfaces of the prism are parallel travels straight without bending.

These light rays pass through an objective lens 113 and enter a modulator 112. The light on the left side of FIG. 13 becomes dark light because the intensity of the light is decreased when the light passes through a dark portion (D) 121 of the modulator 112. This dark light reaches an image formation position 124 of the objective lens 113 and forms an intermediate image. The light passing through the central portion passes through a gray portion (G) 122 of the modulator 112 and forms an intermediate image as light having a slightly attenuated intensity. The light on the right side passes through a bright portion (B) 123 of the modulator 112 and forms an intermediate image with no decrease in the brightness. In this manner the image of the transparent prism sample 115 having a phase distribution is formed as a visible image 111 having bright and dark portions in accordance with changes in the inclination and thickness. The foregoing is the principle of the Hoffman modulation contrast observation.

A conventional combined microscope which is the combination of the modulation contrast microscope and the incident-light fluorescence microscope described above will be described below.

FIG. 14 shows the arrangement of the conventional combined microscope. Light emitted from a transmission light source 131 is bent by a mirror 134, passes through a slit 136 analogous to the slit 106 described above, and is guided to a sample 138 by a condenser 137. The light transmitted through the sample 138 is collected by an objective lens 139 and passed through a modulator 140 similar to the modulators 102 and 112 described above. The light is transmitted through a dichroic mirror 141 for incident-light fluorescence and an absorption filter 142, an image of the light is formed by an image forming lens 143, and the image is guided to an eyepiece 145. The foregoing are the illumination and observation optical paths in the modulation contrast method.

At the same time, the following incident-light fluorescence optical path is formed. Light emitted from an incident light source 146 is guided to an excitation filter 151 through a collector lens 147, etc. The excitation light passing through the excitation filter 151 is reflected by the dichroic mirror 141, passes through the modulator 140 and the objective lens 139, and is irradiated on the sample 138.

The fluorescence emitted from the sample 138 is collected by the objective lens 139 in the same manner as for the image formed by the modulation contrast method and passes through the modulator 140. The light is transmitted through the dichroic mirror 141 and the absorption filter 142, an image of the light is formed by the image forming lens 143, and the image is guided to the eyepiece 145.

By the simultaneous use of the two optical paths formed as above, i.e., the optical path formed by the modulation contrast method and the incident-light fluorescence optical path, the two images formed by the modulation contrast method and the incident-light fluorescence observation method overlap each other and can be observed in the eyepiece 145.

In the first conventional technique described previously, the differential interference observation and the incident-light fluorescence observation can be simultaneously performed with a high efficiency. However, the wavelength region for the differential interference observation formed by a bandpass filter is transmitted through a dichroic mirror and an absorption filter. The wavelength region of the bandpass filter is set between the wavelength region of the excitation filter and that of the absorption filter. Therefore, if a fluorescent dye has a fluorescent wavelength close to the exciting wavelength, the excitation light readily mixes in the observation optical system in the above arrangement. This significantly decreases the contrast of the fluorescent image, i.e., the intensity ratio of the fluorescence to the background.

On the other hand, the second conventional technique described above uses the combination of the modulation contrast microscope and the incident-light fluorescence microscope and can detect, e.g., a fluorescence-labelled protein or gene while detecting the state of a cell or a tissue, thereby checking the position or movement of the protein or gene.

Since, however, optical members such as a modulator are inserted in the observation optical system, the brightness of the fluorescent image critically decreases particularly in the incident-light fluorescence observation. In addition, a cell or a tissue observed by the pupil modulation microscopic method using, e.g., the modulation contrast microscope generally has a white background. Accordingly, if the fluorescence to be simultaneously observed has a similar color, it is difficult to separate the image of a cell or a tissue from the fluorescent image.

BRIEF SUMMARY OF THE INVENTION

It is an object of the present invention to provide the following incident-light fluorescence microscopes.

(a) An incident-light fluorescence microscope having a simple arrangement and capable of simultaneously performing differential interference observation with a high efficiency and incident-light fluorescence observation with a high efficiency (by which a bright fluorescent image can be obtained), and obtaining a fluorescent image with a high contrast, and increasing the separation between the image formed by the differential interference observation and the image formed by the incident-light fluorescence observation.

(b) An incident-light fluorescence microscope capable of performing combined microscopy of a pupil modulation microscopic method with a high efficiency (by which a bright fluorescent image can be obtained), and incident-light fluorescence observation with a high efficiency (by which a bright fluorescent image can be obtained), and increasing the separation between the image formed by the pupil modulation microscopic method and the incident-light fluorescent image.

An incident-light fluorescence microscope of the present invention is an incident-light fluorescence microscope comprising a transmission illuminating optical system which has a first optical member for receiving light emitted from a light source and extracting transmitted light and which irradiates the transmitted light onto a sample, an observation optical system having an objective lens and a second optical member and positioned closer to the objective lens than the sample, and an incident-light fluorescence illuminating optical system provided in the observation optical system, wherein the first optical member has a peak of transmittance at a wavelength longer than a fluorescent wavelength, and the second optical member selectively modulates only a wavelength transmitted through the first optical member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2A is a graph showing the spectral transmittance characteristics of an excitation filter, a dichroic mirror, an absorption filter, and a bandpass filter according to the first embodiment of the present invention;

FIG. 2B is a graph showing the spectral transmittance characteristics of an excitation filter, a dichroic mirror, an absorption filter, and a sharp cut filter;

FIG. 3A is a graph showing the spectral transmittance characteristic of a dichroic mirror according to the second embodiment of the present invention, which relates to the rear surface of the dichroic mirror;

FIG. 3B is a graph showing the spectral transmittance characteristic of the dichroic mirror according to the second embodiment of the present invention, which relates to the front surface of the dichroic mirror;

DETAILED DESCRIPTION OF THE INVENTION

Figure 1:
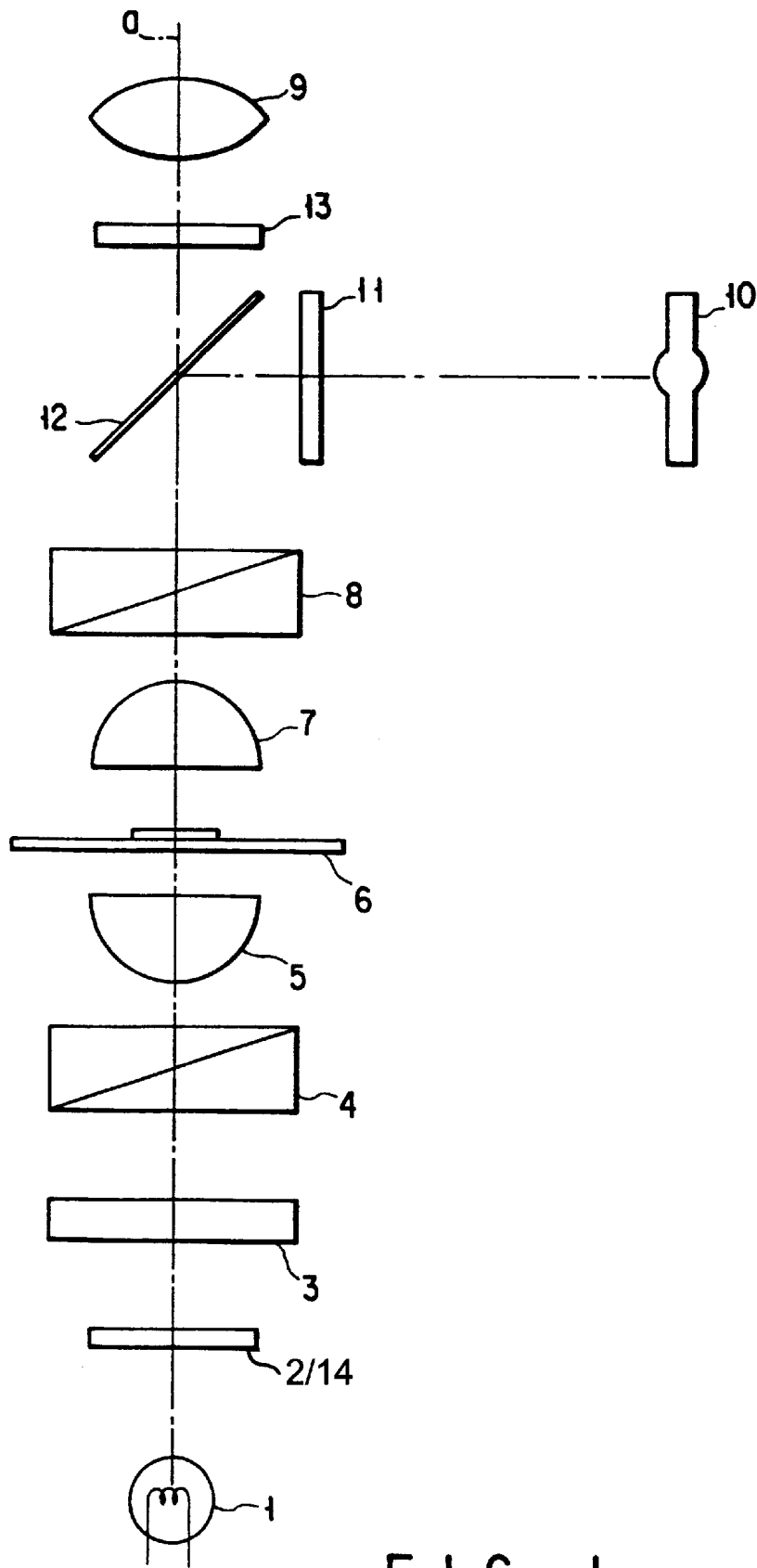
FIG. 1 is a view showing the arrangement of an incident-light fluorescence microscope according to the first embodiment of the present invention.

FIG. 1 is a view showing the arrangement of an incident-light fluorescence microscope according to the first embodiment of the present invention. The microscope shown in FIG. 1 can simultaneously perform a differential interference observation method and an incident-light fluorescence observation method.

First, portions relating to the differential interference observation in FIG. 1 will be described. Only a specific wavelength of light emitted from a transmission light source 1 is transmitted through a bandpass filter 2 (or sharp cut filter 14) and enters a polarizer 3. Note that the spectral transmittance characteristic of the bandpass filter 2 (and sharp cut filter 14) will be described later.

The exit linearly polarized light from the polarizer 3 is divided into two linearly polarized light rays which vibrate in orthogonal directions by mean of a Wollaston prism (birefringence element) 4. These two linearly polarized light rays are condensed by a condenser lens 5 and traverse a sample 6 with a shear (lateral shift). The two light rays are transmitted through an objective lens 7 and interfere with each other by mean of a second Wollaston prism 8 and an analyzer function of a dichroic mirror 12 (to be described later). The interference image created by these two wave surfaces is observed through an image forming lens 9 as bright-dark fringes or the contrast of colors obtained by differentiating the phase change of the sample 6.

Portions relating to the incident-light fluorescence observation in FIG. 1 will be described next. Of wavelengths emitted from an excitation light source 10, e.g., a super-high pressure mercury lamp, only a wavelength necessary to excite the sample 6 is transmitted through an excitation filter 11. The wavelength transmitted through the excitation filter 11 is selectively reflected by the dichroic mirror 12. Note that the dichroic mirror 12 has a coating with a spectral transmittance characteristic to be described later and therefore transmits wavelengths longer than a specified wavelength region. The excitation light reflected by the dichroic mirror 12 passes through the Wollaston prism 8 and is irradiated on the sample 6 by the objective lens 7.

As a consequence, a portion of the sample 6 dyed by a fluorescent dye is excited to emit fluorescence with a wavelength longer than that of the excitation light. This fluorescence is collected by the objective lens 7. The fluorescence is transmitted through the Wollaston prism 8 and the dichroic mirror 12. The fluorescence transmitted through the dichroic mirror 12 is transmitted through an absorption filter 13 which transmits only a fluorescent image having a wavelength longer than a specified wavelength region. The fluorescence transmitted through the absorption filter 13 is guided to the image forming lens 9 and observed through it.

FIG. 2A is a graph showing the spectral transmittance characteristics of the excitation filter 11, the dichroic mirror 12, the absorption filter 13, and the bandpass filter 2 described above. Note that the spectral transmittance characteristics of the excitation filter 11 and the absorption filter 13 are generally similar to those of conventional incident-light fluorescence microscopes. The dichroic mirror 12 is coated such that a spectral transmittance T, by which excitation light is reflected and fluorescence is transmitted, abruptly increases regardless of polarized light in a wavelength region Tu in which the spectral transmittance T rises, and such that p-polarized light falls at a longer wavelength than s-polarized light in a wavelength region TD in which the spectral transmittance T falls.

As shown in FIG. 2A, when the peak of the spectral transmittance characteristic of the bandpass filter 2 is set between the trailing edges of the p-polarized light and the s-polarized light of the dichroic mirror 12, the p-polarized light of the dichroic mirror 12 is transmitted and its s-polarized light is not transmitted in this wavelength region. That is, when the bandpass filter 2 is arranged in a transmission illuminating system so that differential interference observation is done in this wavelength region, the dichroic mirror 12 functions as a polarizing plate. Therefore, this dichroic mirror 12 can be used as an analyzer for the differential interference observation. On the other hand, a fluorescent wavelength region D can be efficiently transmitted through the dichroic mirror 12 and the absorption filter 13, so the fluorescent image does not darken. Accordingly, differential interference and incident-light fluorescence can be simultaneously observed with a very high efficiency.

Furthermore, in the rising wavelength region Tu of the dichroic mirror 12 and the rising wavelength region of the absorption filter 13, there is no polarized light dependence and the transmittance rises sharply. Therefore, the excitation light is completely intercepted by the dichroic mirror 12 and the absorption filter 13 and hence does not mix in the fluorescent image. Consequently, a fluorescent image with high contrast can be obtained. This is particularly effective in observation using a fluorescent dye having a fluorescent wavelength close to the exciting wavelength.

FIG. 2B is a graph showing the spectral characteristics of the excitation filter 11, the dichroic mirror 12, the absorption filter 13, and a sharp cut filter 14 which may be used instead of the bandpass filter 2 described above. As shown in FIG. 2B, the sharp cut filter 14 has a spectral transmittance characteristic that cuts the wavelength region at the trailing edges of the s-polarized light of the dichroic mirror 12 and transmits the wavelength region at the trailing edges of the p-polarized light of the dichroic mirror 12.

FIGS. 3A and 3B are graphs showing the spectral transmittance characteristics of a dichroic mirror 12 according to the second embodiment of the present invention. In this second embodiment, coatings having the spectral transmittance characteristics shown in FIGS. 3A and 3B are formed on the rear surface (on the side of a transmission light source 1 and an excitation light source 10) and the front surface (on the side of an image forming lens 9), respectively, of the dichroic mirror 12. By the combination of these coatings, spectral transmittance characteristics as shown in FIG. 2 are obtained. The result is the advantage that the design of coating can be performed more easily than in the first embodiment.

Figure 4:
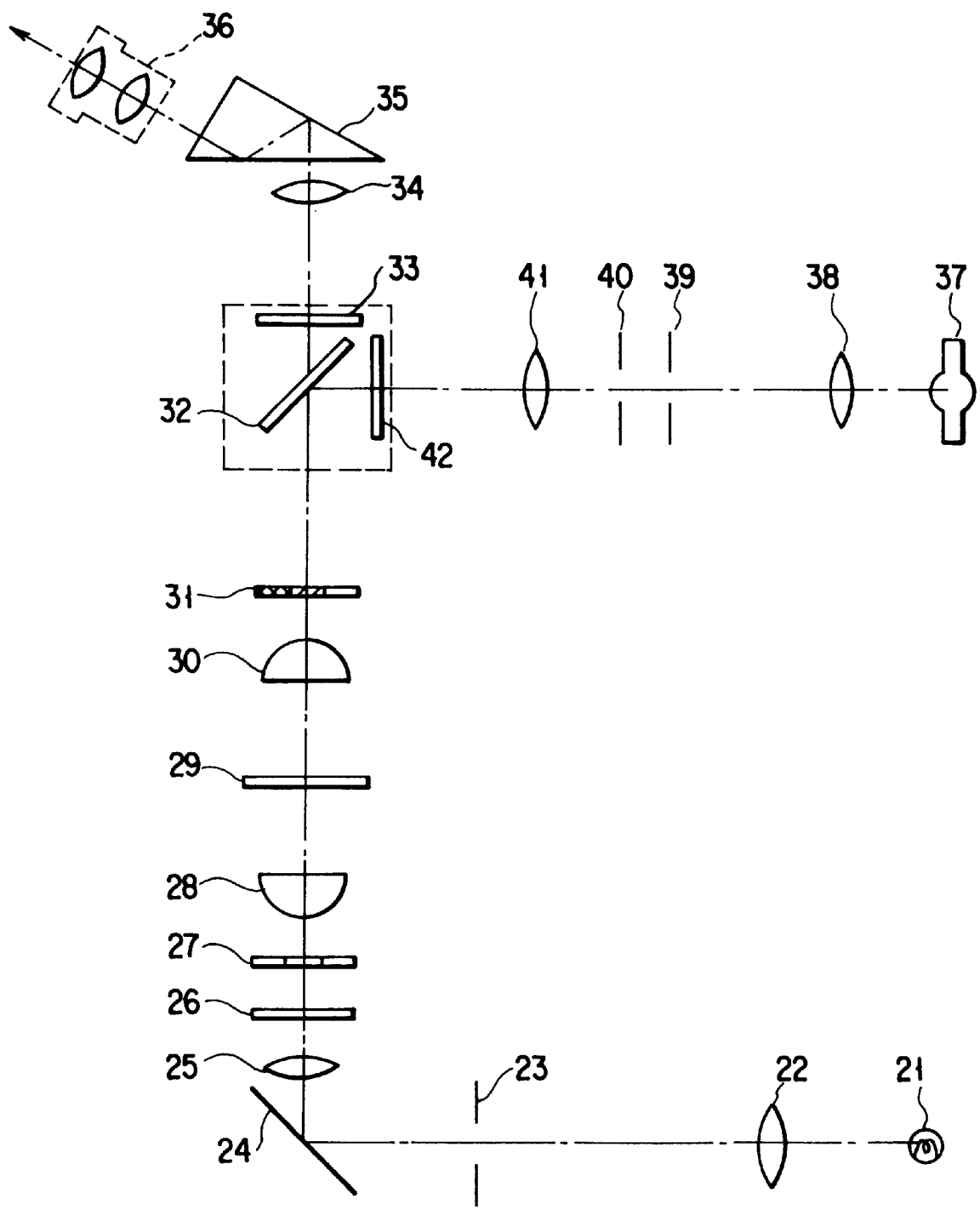
FIG. 4 is a view showing the arrangement of an incident-light fluorescence microscope according to the third embodiment of the present invention.

FIG. 4 is a view showing the arrangement of an incident-light fluorescence microscope according to the third embodiment of the present invention. The microscope shown in FIG. 4 can simultaneously perform Hoffman modulation contrast observation as a pupil modulation microscopic method and an incident-light fluorescence observation method.

First, portions relating to the Hoffman modulation contrast observation in FIG. 4 will be described below. A transmission light source 21 is, e.g., a halogen lamp. Illuminating light emitted from the transmission light source 21 travels through a collector lens 22, passes through a field stop 23, and reflected by a return mirror 24. The light passes through a window lens 25, and only a specific wavelength is transmitted through a bandpass filter 26. This specific wavelength enters a slit 27 positioned on the front focal plane of a condenser lens 28. Note that the spectral transmittance characteristic of the bandpass filter 26 will be described later.

The exit light from the slit 27 is condensed by the condenser lens 28 to illuminate a sample 29. The light transmitted through the sample 29 is collected by an objective lens 30 and transmitted through a modulator 31 positioned on the exit pupil plane of the objective lens 30 and having three different wavelength characteristics (to be described later). The light is transmitted through a dichroic mirror 32 and an absorption filter 33 and guided to an eyepiece 36 through an image forming lens 34 and a prism 35. Consequently, an image based on the principle described previously in the second conventional technique is observed.

Portions relating to the incident-light fluorescence observation in FIG. 4 will be described below. Light emitted from an excitation light source 37, e.g., a super-high pressure mercury lamp is collected by a collector lens 38 and guided to an excitation filter 42 through an aperture stop 39, a field stop 40, and a projecting lens 41. Only a wavelength of the light necessary to excite the sample 29 is transmitted by the excitation filter 42. The wavelength transmitted through the excitation filter 42 is selectively reflected by the dichroic mirror 32. Note that the dichroic mirror 32 transmits wavelengths longer than a specified wavelength region. The excitation light reflected by the dichroic mirror 32 passes through the modulator 31 and is irradiated on the sample 29 by the objective lens 30.

Consequently, a portion of the sample 29 dyed by a fluorescent dye is excited to emit fluorescence with a wavelength longer than that of the excitation light. The fluorescence thus emitted is collected by the objective lens 30. The fluorescence is transmitted through the modulator 31 and the dichroic mirror 32. The fluorescence transmitted through the dichroic mirror 32 is transmitted through the absorption filter 33 which transmits only a fluorescent image having a wavelength longer than a specified wavelength region. The fluorescence transmitted through the absorption filter 33 is guided to the eyepiece 36 through the image forming lens 34 and the prism 35 and observed.

Figure 5:
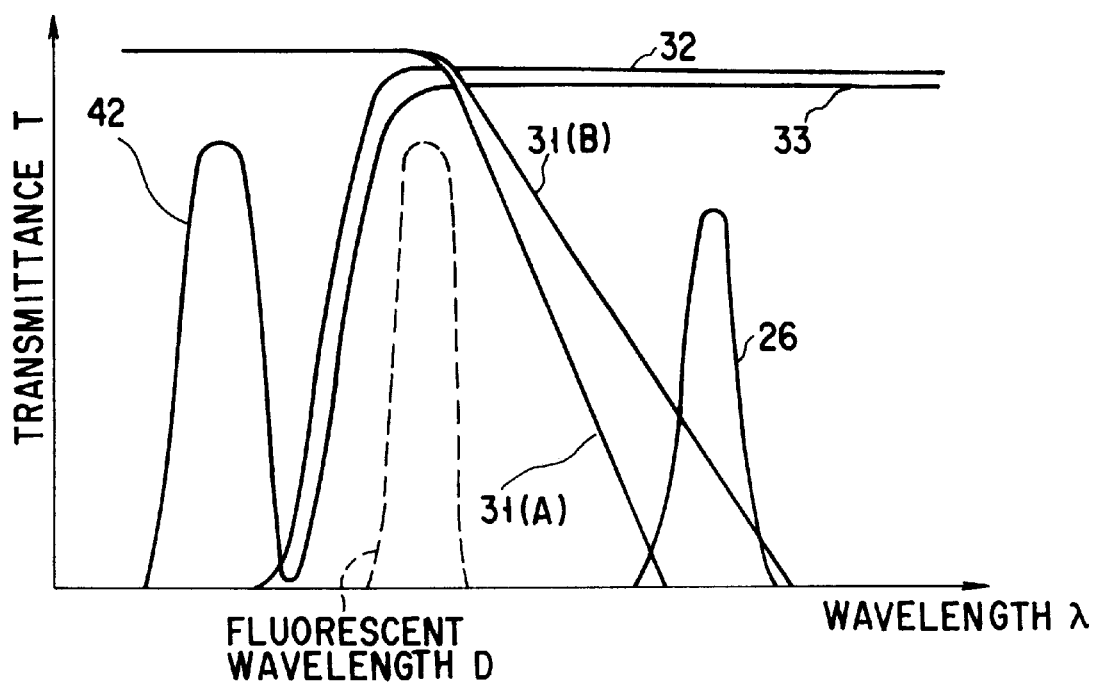
FIG. 5 is a graph showing the spectral transmittance characteristics of an excitation filter, a dichroic mirror, an absorption filter, a bandpass filter, and a modulator according to the third embodiment of the present invention.

FIG. 5 is a graph showing the spectral transmittance characteristics of the excitation filter 42, the dichroic mirror 32, the absorption filter 33, the bandpass filter 26, and the modulator 31. Note that the spectral transmittance characteristics of the excitation filter 42, the dichroic mirror 32, and the absorption filter 33 are common ones similar to those of conventional incident-light fluorescence microscopes.

Figure 6:
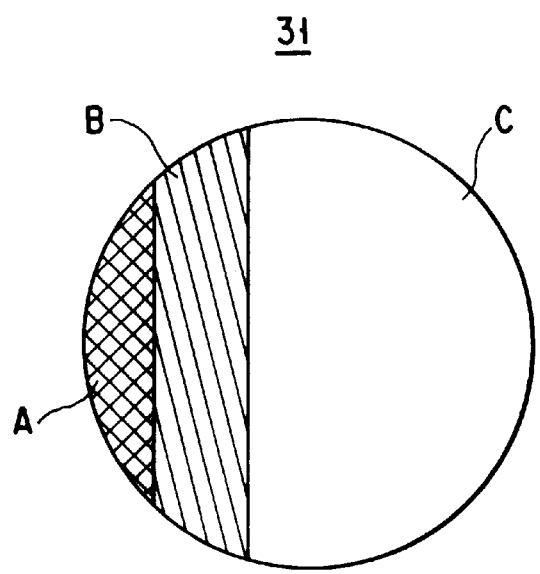
FIG. 6 is a view showing the arrangement of the modulator according to the third embodiment of the present invention.

FIG. 6 is a view showing the arrangement of the modulator 31. As shown in FIG. 6, the modulator 31 consists of three portions. Each of portions indicated by A and B has a transmittance characteristic in which, as shown in FIG. 5, a transmittance T decreases from a predetermined spectral wavelength toward longer wavelengths with a comparatively moderate slope. Although not shown in FIG. 5, a portion C has a transmittance close to 100% to all wavelengths.

Figure 12A:
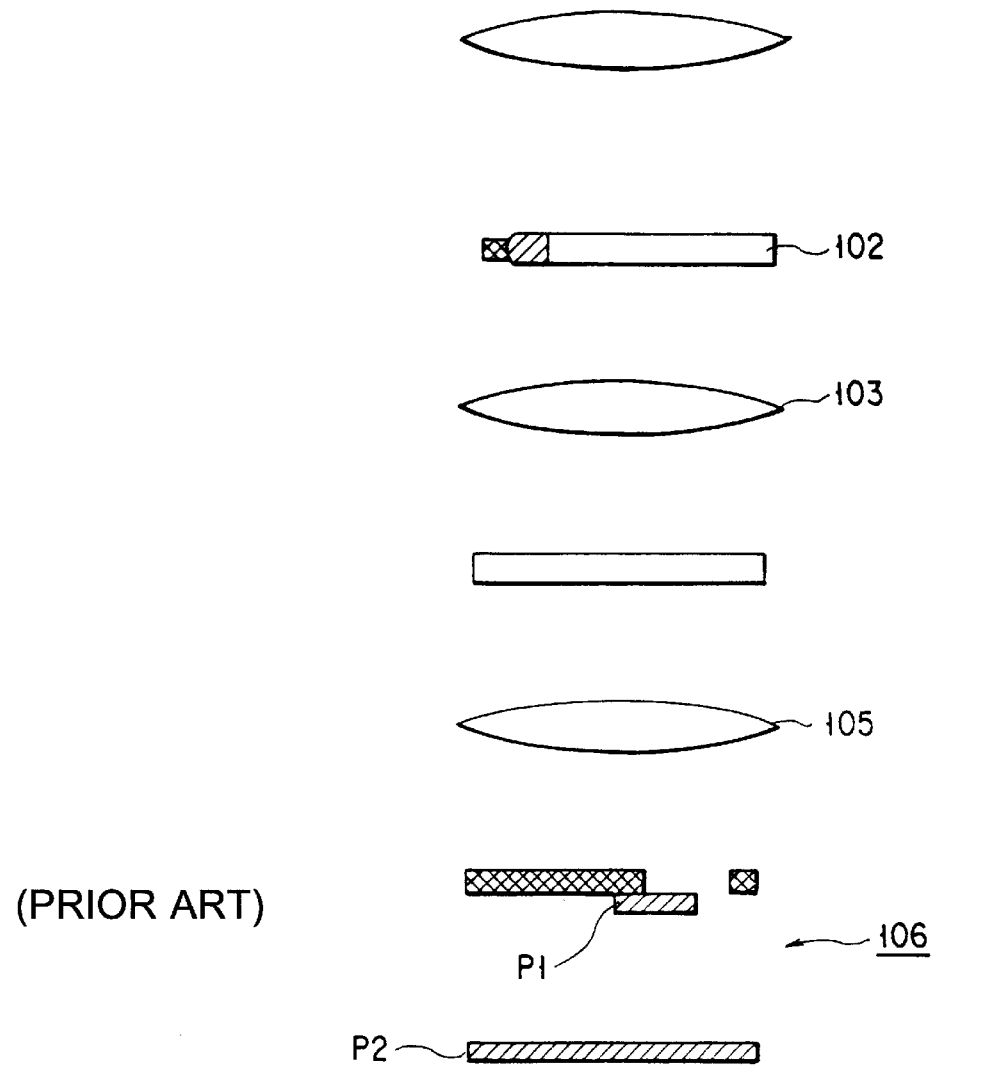
FIG. 12A is a view showing the arrangement of a conventional technique obtained by adding elements for a modulation contrast method to a common microscope.
Figure 12B:
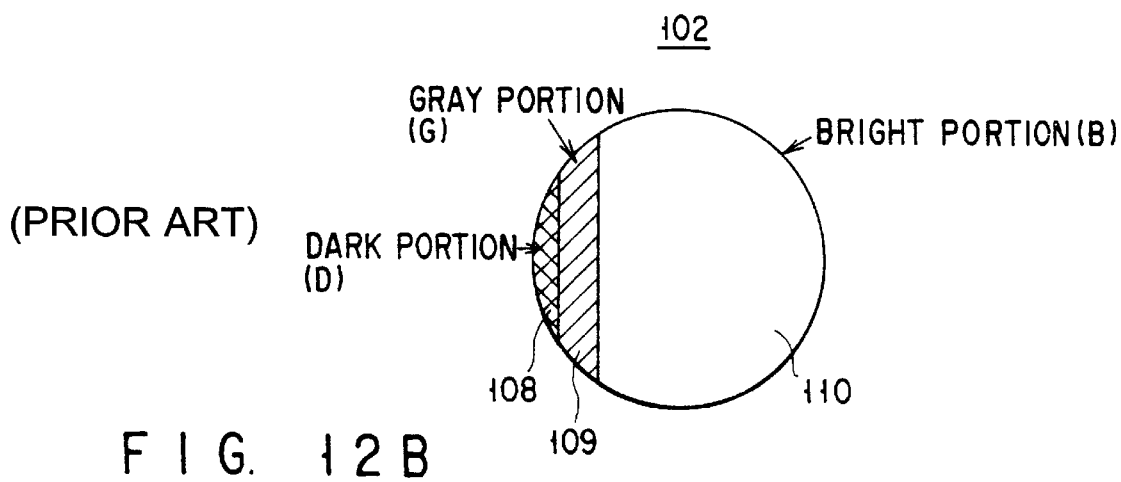
FIG. 12B is a view showing a filter having regions with three different transmittances according to the conventional technique.
Figure 13:
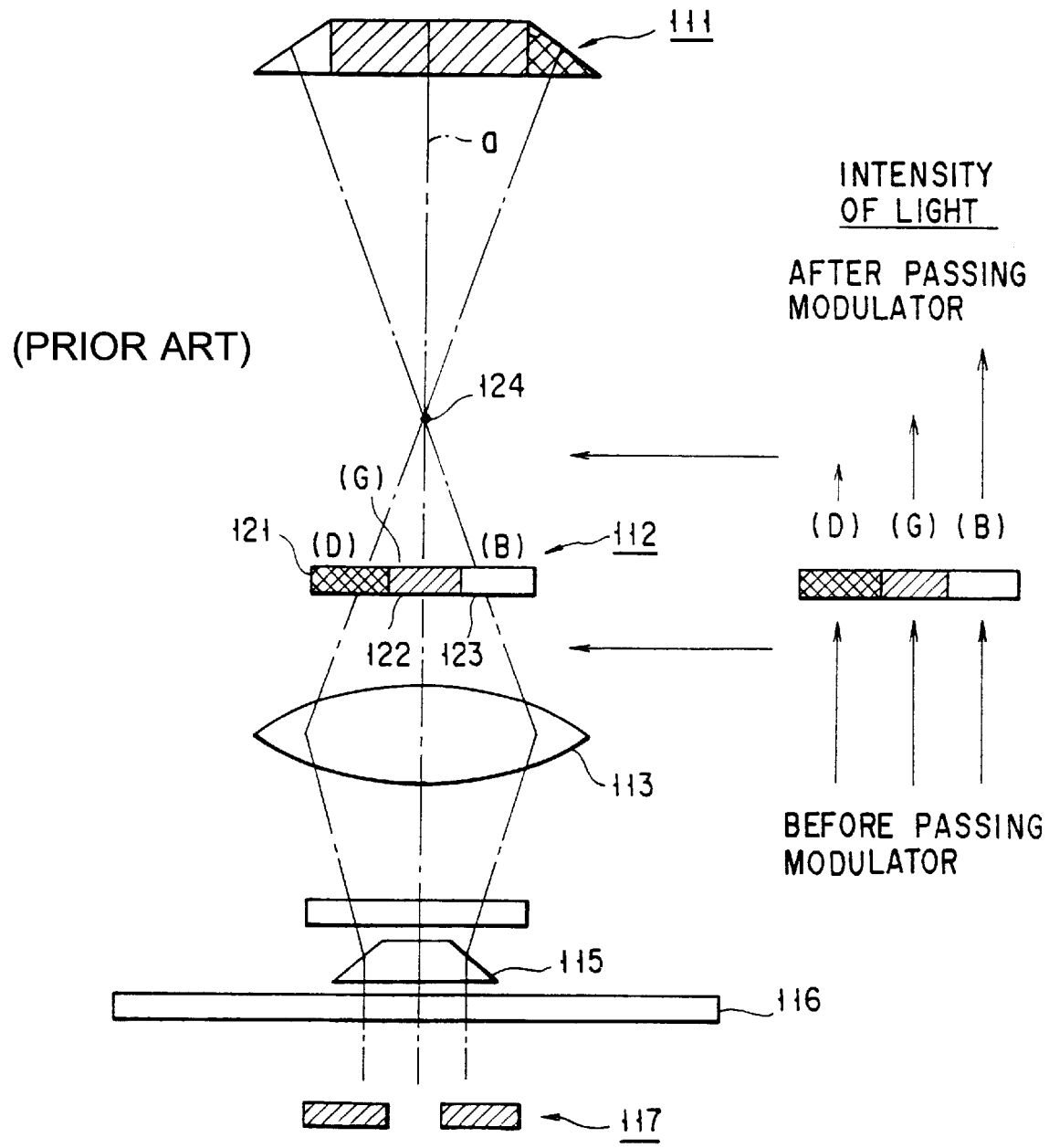
FIG. 13 is a view according to another conventional technique, which shows a process in which light transmitted through a transparent phase object forms an image with contrast via a modulator.
Figure 14:
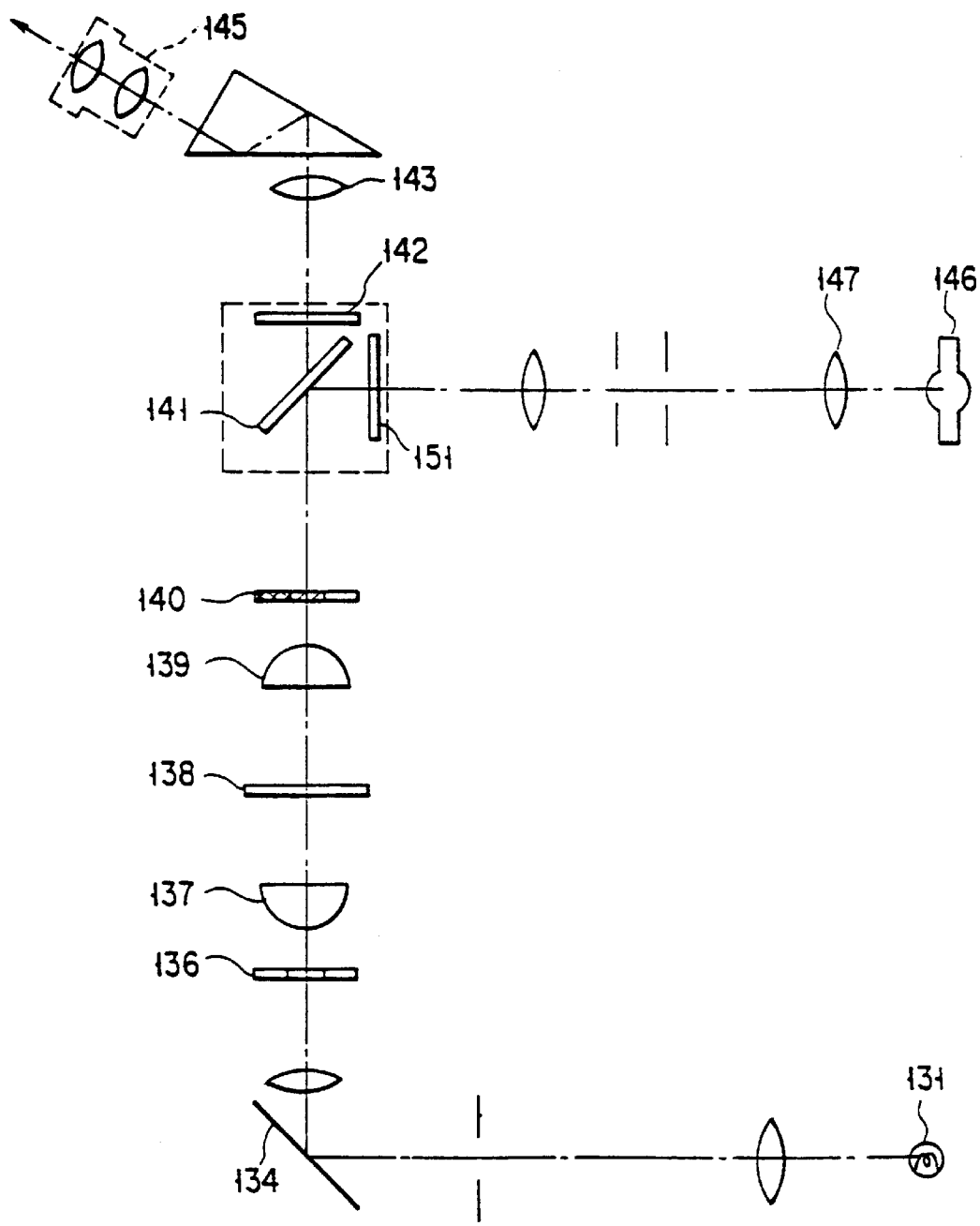
FIG. 14 is a view showing the arrangement of a conventional combined microscope.

As shown in FIG. 5, the peak of the spectral transmittance characteristic of the bandpass filter 26 is set between positions where the transmittances of the portions A and B of the modulator 31 are 0. In this wavelength region, the portion A of the modulator 31 transmits almost no light, the portion B has a transmittance of a few tens of %, and the portion C transmits nearly 100% of light. Accordingly, these portions A, B, and C correspond to a dark portion (D) 108, a gray portion (G) 109, and a bright portion (B) 110 of a modulator shown in FIG. 12B which is necessary to Hoffman modulation contrast observation. Consequently, in the transmission wavelength region of the bandpass filter 26, the effect of Hoffman modulation contrast observation is obtained.

On the other hand, the modulator 31 has a high transmittance in wavelength regions necessary for fluorescence observation, i.e., a region in which the excitation filter 42 has a transmittance of 100% and a wavelength region D of the emitted fluorescence, as shown in FIG. 5. Thus the modulator 31 has no influence on fluorescence observation, and so the fluorescent image does not darken. In this third embodiment, therefore, it is possible to simultaneously observe Hoffman modulation contrast and incident-light fluorescence with a very high efficiency without any loss even in fluorescence observation.

Figure 7:
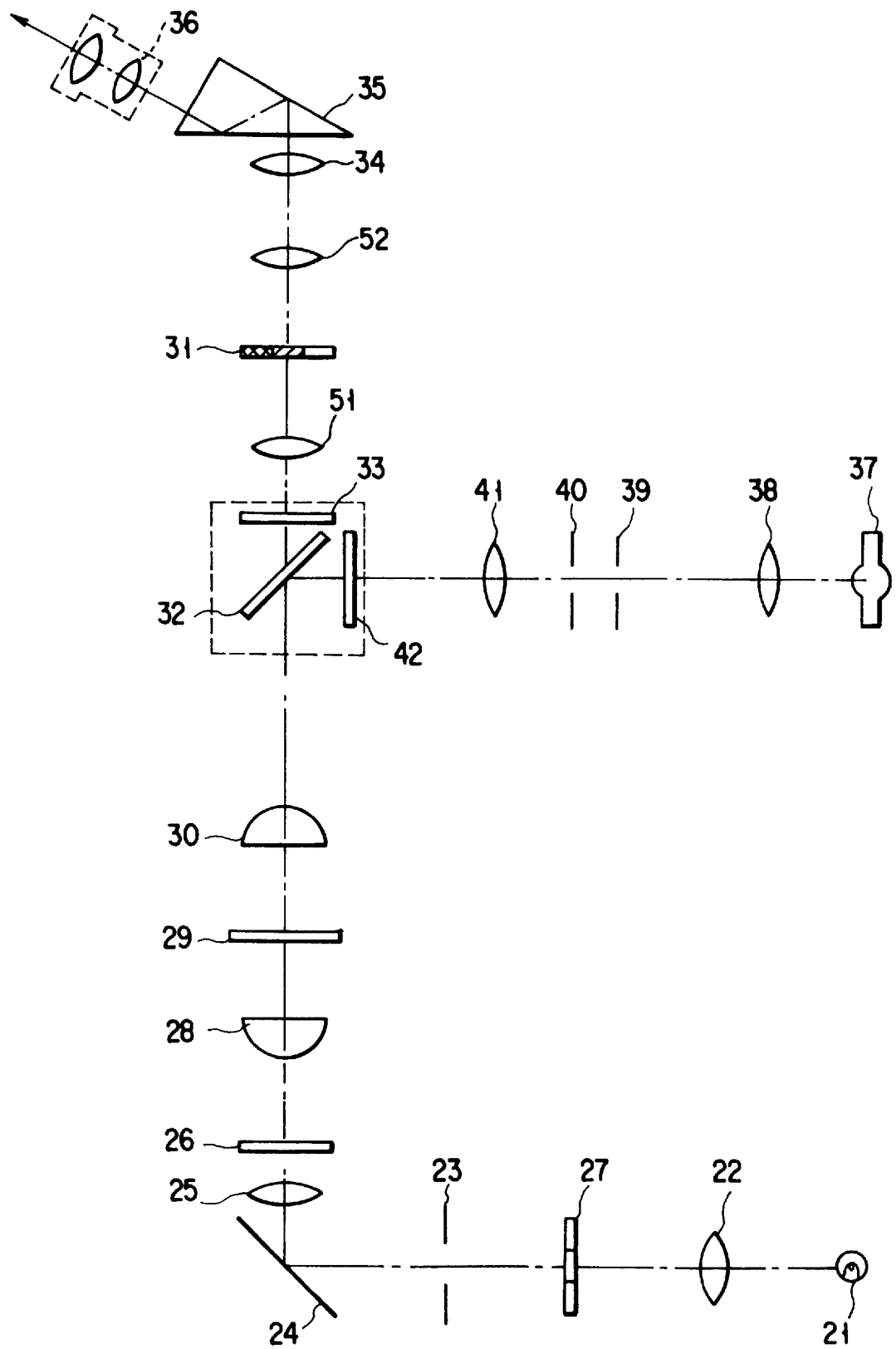
FIG. 7 is a view showing the arrangement of an incident-light fluorescence microscope according to the fourth embodiment of the present invention.

FIG. 7 is a view showing the arrangement of an incident-light fluorescence microscope according to the fourth embodiment of the present invention. Note that the same reference numerals as in FIG. 4 denote the same parts in FIG. 7 and a detailed description thereof will be omitted. Like in the third embodiment, the microscope shown in FIG. 7 can perform a Hoffman modulation contrast observation method and an incident-light fluorescence observation method at the same time.

In the above third embodiment, as shown in FIG. 4, the slit 27 and the modulator 31 necessary to the Hoffman modulation contrast observation are generally arranged on the front focal plane of the condenser lens 28 and the exit pupil plane of the objective lens 30, respectively. However, these two positions are usually between lens groups consisting of a plurality of lenses and so there is no large space.

Also, it is sometimes not possible to arrange the slit 27 and the modulator 31 in their respective correct positions due to restrictions on the arrangement. If this is the case, these elements are moved in the direction of the optical axis as long as the optical performance is not degraded. Furthermore, the modulator 31 is sometimes formed as a coating on the surface of one of lenses constituting the objective lens 30. To change the characteristic in a case like this, the whole objective lens must be replaced. Also, the technique of coating is difficult.

In this fourth embodiment, as shown in FIG. 7, an optically conjugate position of the exit pupil plane of the objective lens 30 can be formed in the observation optical path by the use of a pupil projecting lens 51 and a relay lens 52. Since the position is optically conjugate, Hoffman modulation contrast observation can be performed even when a modulator 31 is arranged in the position of the projected pupil. A slit 27 on the illumination side can also be arranged in the optically conjugate position of the front focal plane of the condenser lens 28.

FIG. 7 shows the arrangement in which the slit 27 and the modulator 31 are arranged in the optically conjugate positions as described above. With this arrangement, the slit 27 and the modulator 31 can be arranged in positions with large spaces and therefore can be easily replaced. Accordingly, by replacing the modulator 31 with one having the spectral transmittance characteristic as shown in FIG. 5, it is possible to change the transmittance to the transmission wavelength region of a bandpass filter 26 in accordance with the characteristic of a sample and adjust the effect of Hoffman modulation contrast observation.

Also, in simultaneous observation of Hoffman modulation contrast and incident-light fluorescence, the Hoffman modulation contrast and the incident-light fluorescence can be simultaneously observed with a high efficiency like in the third embodiment.

Figure 8:
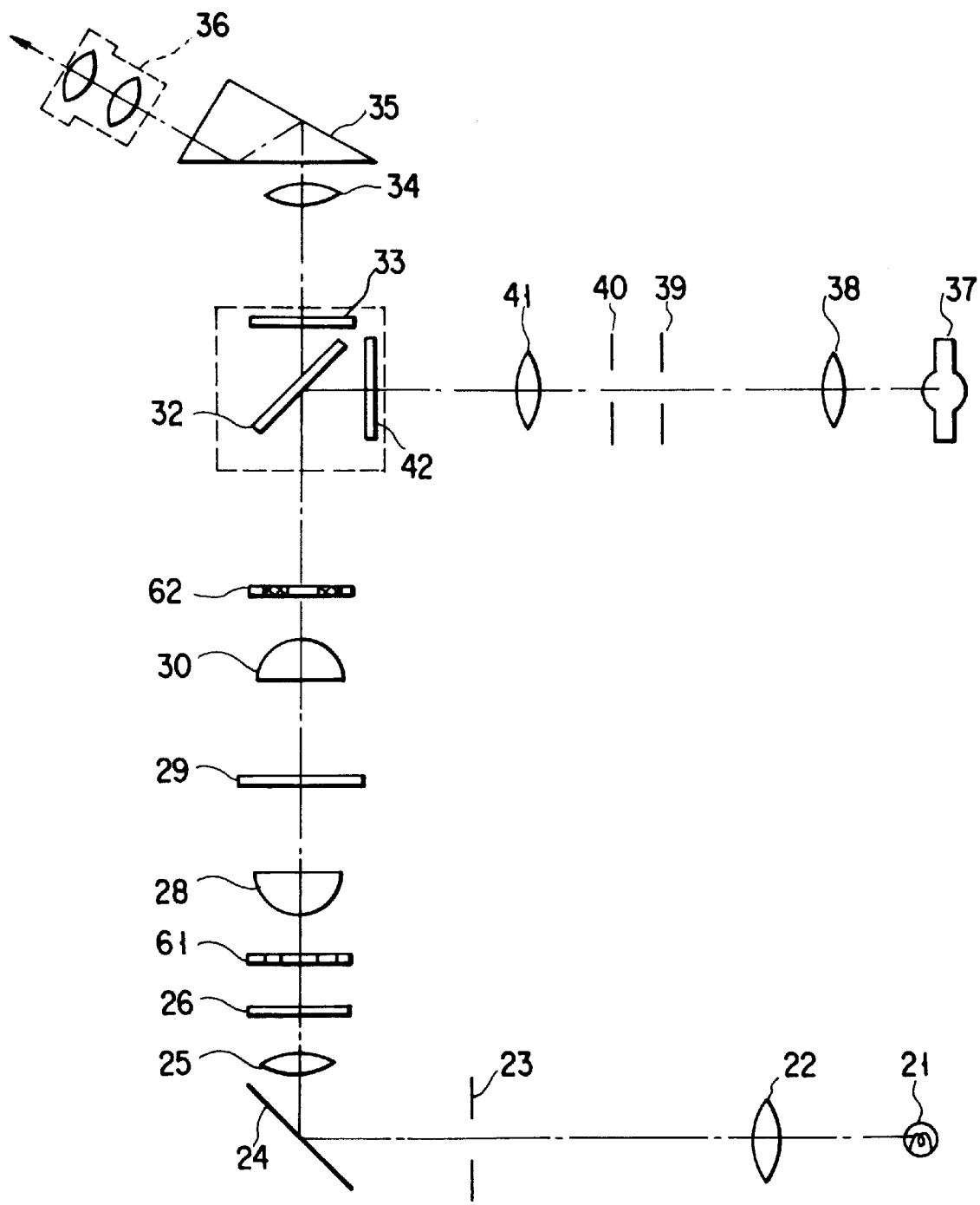
FIG. 8 is a view showing the arrangement of an incident-light fluorescence microscope according to the fifth embodiment of the present invention.

FIG. 8 is a view showing the arrangement of an incident-light fluorescence microscope according to the fifth embodiment of the present invention. Note that the same reference numerals as in FIG. 4 denote the same parts in FIG. 8 and a detailed description thereof will be omitted. The microscope shown in FIG. 8 can simultaneously perform a phase difference observation method as a pupil modulation microscopic method, instead of the Hoffman modulation contrast observation method in the third embodiment, and an incident-light fluorescence observation method. Since, therefore, the basic optical arrangement and the like are analogous to those of the third embodiment, a slit 61 and a modulator 62 as principal elements of the phase difference observation will be described below.

Figure 9A:
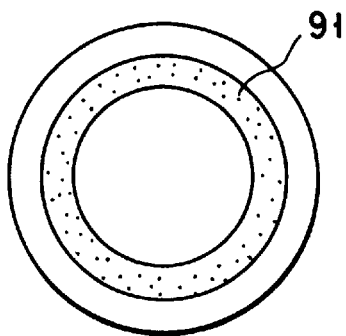
FIG. 9A is a view showing a phase difference modulator according to the fifth embodiment of the present invention.
Figure 9B:
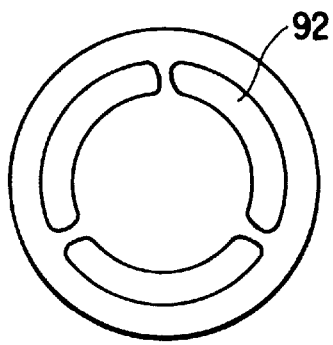
FIG. 9B is a view showing a phase difference slit according to the fifth embodiment of the present invention.

FIGS. 9A and 9B are views showing the phase difference modulator 62 arranged on the exit pupil plane of an objective lens 30 and the phase difference slit 61 arranged on the front focal plane of a condenser lens 28, respectively, in FIG. 8. In FIG. 9A, reference numeral 91 denotes a phase film portion of the modulator 62. In FIG. 9B, reference numeral 92 denotes holes in the slit 61.

The principle of the phase difference observation will be briefly described below although the principle is well known. Light passes through the slit 61 and a plane wave reaches a sample 29 via a condenser lens 28. If there is no sample 29, an image of the holes 92 is formed inside the phase film portion 91 of the modulator 62 by the objective lens 30. Light diffracted by the sample 29 propagates outside the phase film portion 91, and only 0th-order light which is not diffracted passes through the phase film portion 91. Note that since the phase of the light diffracted by the sample 29 lags behind the phase of the 0th-order light, the phase of the 0th-order light is delayed ¼ λ or ¾ λ by the phase film portion 91. At the same time, the intensity of the 0th-order light is decreased to make the 0th-order light interfere with the diffracted light, thereby giving contrast to the image to be observed. Generally, the transmittance of the phase film portion 91 is several % to about 40%. Therefore, when incident-light fluorescence observation is simultaneously performed, a considerable amount of the fluorescence is lost.

Figure 10:
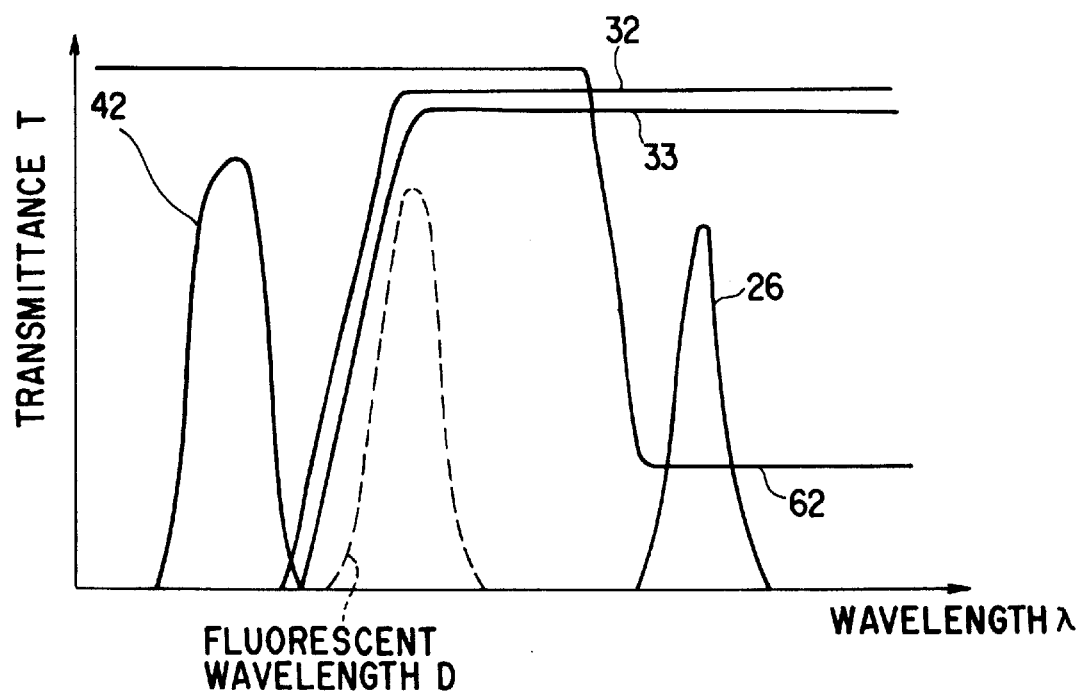
FIG. 10 is a graph showing the spectral transmittance characteristics of an excitation filter, a dichroic mirror, an absorption filter, a bandpass filter, and a modulator according to the fifth embodiment of the present invention.

FIG. 10 is a graph showing the spectral transmittance characteristics of an excitation filter 42, a dichroic mirror 32, an absorption filter 33, a bandpass filter 26, and the modulator 62 described above. As shown in FIG. 10, the phase film portion 91 of the modulator 62 has a spectral transmittance characteristic in which the transmittance is high at wavelengths shorter than a predetermined wavelength and low at wavelengths longer than the predetermined wavelength.

As in FIG. 10, the peak of the spectral transmittance characteristic of the bandpass filter 26 is set in a region where the transmittance of the modulator 62 (i.e., the phase film portion 91) is low. Consequently, the transmittance of the bandpass filter 26 decreases in this wavelength region. This gives the bandpass filter 26 the function of lowering the intensity of the 0th-order light required for the phase difference observation. Accordingly, by combining this function and the function of delaying the phase, the effect of the phase difference observation can be obtained in the transmission wavelength region of the bandpass filter 26.

In addition, the spectral transmittance characteristic of the phase film portion 91 has a high transmittance in wavelength regions necessary for fluorescence observation, i.e., a region where the excitation filter 42 has a transmittance of 100% and a wavelength region D of the emitted fluorescence, as shown in FIG. 10. Since, therefore, the phase film portion 91 has no influence on the fluorescence observation, the fluorescent image does not darken. Accordingly, in this fifth embodiment it is possible to simultaneously observe a phase difference and incident-light fluorescence with a very high efficiency without any loss even in fluorescence observation.

Figure 11:
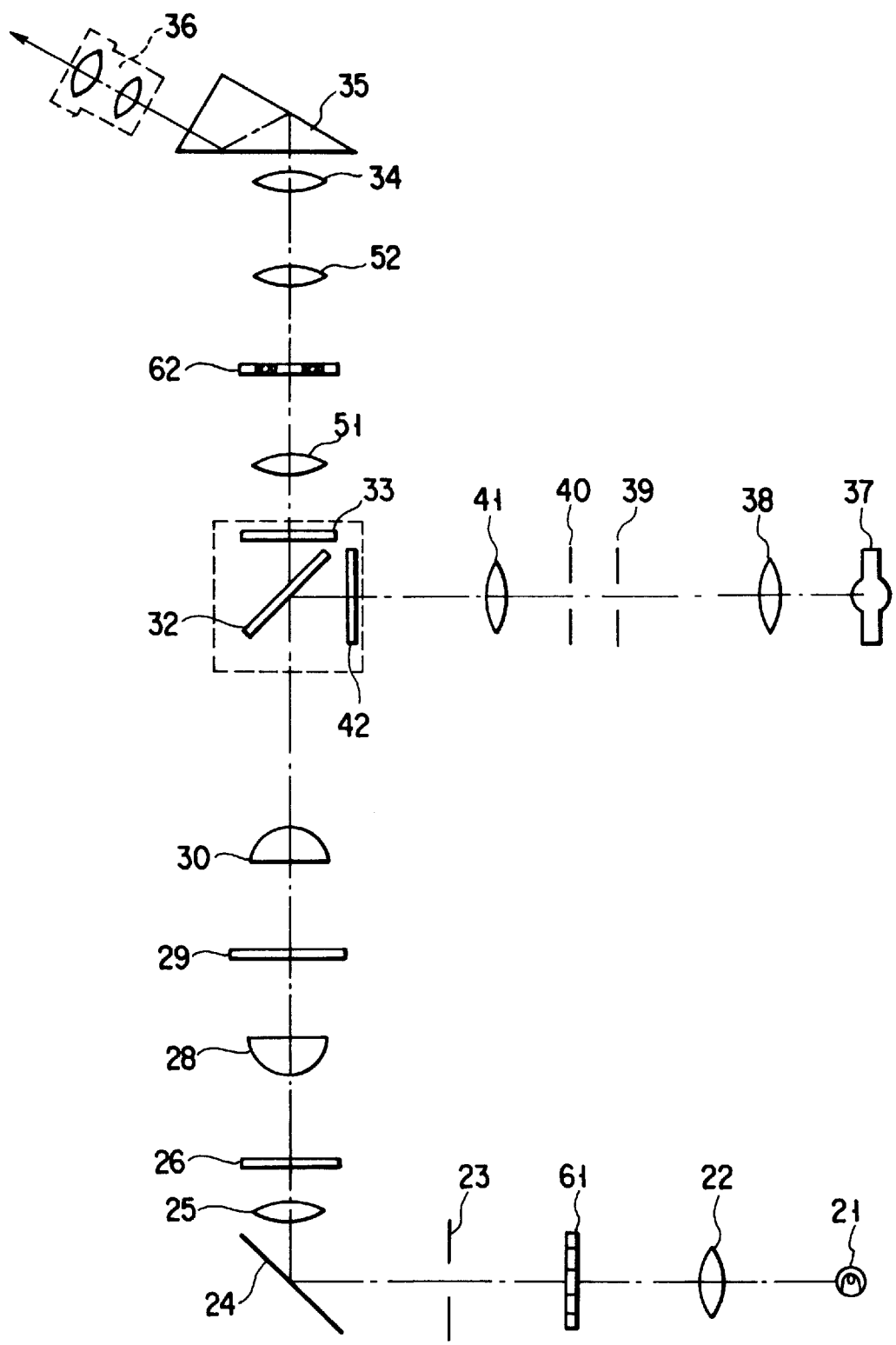
FIG. 11 is a view showing the arrangement of an incident-light fluorescence microscope according to the sixth embodiment of the present invention.

FIG. 11 is a view showing the arrangement of an incident-light fluorescence microscope according to the sixth embodiment of the present invention. Note that the same reference numerals as in FIG. 8 denote the same parts in FIG. 11 and a detailed description thereof will be omitted. As in the fifth embodiment described above, the microscope shown in FIG. 11 can simultaneously perform a phase difference observation method and an incident-light fluorescence observation method.

As described in the fourth embodiment, this microscope can form an optically conjugate position of the exit pupil plane of an objective lens 30 in the observation optical path by using the functions of a pupil projecting lens 51 and a relay lens 52. Since this optically conjugate position is formed, phase difference observation can be performed even by arranging a phase difference modulator 62 in the position of the projected pupil.

As in Hoffman modulation contrast observation, the phase difference modulator 62 is generally arranged in lenses constituting the objective lens 30. Therefore, to change the modulator 62 it is necessary to replace the whole objective lens 30. However, particularly in phase difference observation, the transmittance and the phase delay of a phase film portion 91 have a plurality of combinations in accordance with the contrast. Accordingly, the same number of objective lenses as the number of combinations are necessary.

In this sixth embodiment, therefore, the modulator 62 is arranged in the position of the projected pupil and replaced with a modulator in which the transmittance of the phase film portion 91 in the transmission wavelength region of a bandpass filter 26 shown in FIG. 10 is changed or a modulator in which the phase delay width of the phase film portion 91 is changed. Consequently, a plurality of contrasts being due to the phase difference can be observed by one objective lens 30. Also, when a phase difference slit 61 on the illumination side is arranged in the optically conjugate position of the front focal plane of a condenser lens 28, the phase difference slit 61 can be easily replaced in a large space.

Furthermore, in simultaneously observing incident-light fluorescence, the modulator 62 can be replaced while the spectral transmittance characteristic shown in FIG. 10 is held. Accordingly, it is possible to keep the high efficiency and change the phase difference contrast method in the simultaneous observation of the phase difference and the incident-light fluorescence.

In the incident-light fluorescence microscope of the present invention as has been described above, a first optical member provided in a transmission illuminating optical system to extract transmitted light has a peak of transmittance at a wavelength longer than a fluorescent wavelength, and a second optical member provided in an observation optical system selectively modulates only the wavelength transmitted through the first optical member. Therefore, the fluorescent wavelength region can be efficiently transmitted through the second optical member, and so the fluorescent image does not darken. This makes the incident-light observation with a very high efficiency feasible. In addition, a fluorescent image with high contrast can be obtained because no excitation light mixes in the fluorescent image. The present invention can be effectively used particularly in observation using a fluorescent dye whose fluorescent wavelength is close to the exciting wavelength.

Also, in the incident-light fluorescence microscope of the present invention, the transmission illuminating optical system and the observation optical system are based on a differential interference observation method. Therefore, the difference between colors formed by a fluorescent image and an image obtained by differential interference observation can be clearly observed. As a consequence, it is possible to simultaneously observe differential interference observation with a very high efficiency and incident-light fluorescence observation with a very high efficiency.

Furthermore, in the incident-light fluorescence microscope of the present invention, the transmission illuminating optical system and the observation optical system are based on a pupil modulation microscopic method. Accordingly, the difference between colors formed by a fluorescent image and an image obtained by the pupil modulation microscopic method can be clearly observed. Consequently, it is possible to simultaneously perform pupil modulation microscopy observation with a very high efficiency and incident-light fluorescence observation with a very high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An incident-light fluorescence microscope comprising:
   a transmission illuminating optical system having a light source for irradiating a sample with light emitted from the light source;
   an objective lens;
   an observation optical system located closer to the objective lens than the sample, said observation optical system including an incident-light fluorescence illuminating optical system;
   a light side filter, a polarizer, a first Wollaston prism and a condenser lens which are arranged between the sample and the light source of the transmission illuminating optical system; and
   a second Wollaston prism, a dichroic mirror, an absorption filter and an image forming lens which are arranged in the observation optical system and which are located further away from the sample than the objective lens;
   wherein said incident-light fluorescence illuminating optical system includes an excitation light source and an excitation filter, and causes light emitted from the excitation light source to be reflected by the dichroic mirror of the observation optical system such that the reflected light is radiated to the sample;
   wherein said dichroic mirror has first and second wavelength bands, said first wavelength band corresponding to wavelengths not less than a fluorescent wavelength emitted from the sample and being a band in which transmission of two perpendicular polarized light beams is permitted, and said second wavelength band corresponding to wavelengths greater than the wavelengths of the first wavelength band and being a band in which transmission of only a predetermined one of said two perpendicular polarized light beam is permitted; and
   wherein said light side filter permits transmission of light whose wavelength is not less than the second wavelength band of the dichroic mirror.

2. A microscope according to claim 1, wherein said light side filter comprises a band-pass filter for transmission of light whose wavelength is in a predetermined wavelength band within the second wavelength band.

3. A microscope according to claim 1, wherein said light side filter comprises a sharp cut filter having a wavelength band greater than the second wavelength band.

4. A microscope according to claim 1, wherein said dichroic mirror has a reflecting surface covered with a coating which reflects the light emitted from the excitation light source, transmits a fluorescence from said sample, and also transmits the two perpendicular polarized light beams having wavelengths which fall into said first wavelength band and only a predetermined one of said two perpendicular polarized light beams whose wavelength falls into said wavelength band.

5. A microscope according to claim 1, wherein said dichroic mirror has a reflecting surface which reflects the light emitted from the excitation light source and transmits a fluorescence from said sample, and a surface opposite the reflecting surface having a coating which transmits the two perpendicular polarized light beams having wavelengths which fall within said first wavelength band and only a predetermined one of said two perpendicular polarized light beams whose wavelength falls within said second wavelength band.

6. A microscope according to claim 1, wherein said first wavelength band is a band which permits transmission of both S-polarized light and P-polarized light, and wherein said second wavelength band is a band which permits transmission of only the P-polarized light.

7. An incident-light fluorescence microscope comprising:

a transmission illuminating optical system having a light source for irradiating a sample with light emitted from the light source;

an objective lens;

an observation optical system located closer to the objective lens than the sample, said observation optical system including an incident-light fluorescence illuminating optical system;

a band-pass filter, a slit and a condenser lens which are arranged between the sample and the light source of the transmission illuminating optical system; and a Hoffman modulator, a dichroic mirror, an absorption filter and an image forming lens which are arranged in the observation optical system and which are located further away from the sample than the objective lens;

wherein said incident-light fluorescence illuminating optical system includes an excitation light source and an excitation filter, and causes light emitted from the excitation light source to be reflected by the dichroic mirror of the observation optical system such that the reflected light is radiated to the sample;

wherein said Hoffman modulator permits transmission of a fluorescent wavelength emitted from the sample, and has a selective wavelength band in a wavelength region greater than the fluorescent wavelength; and wherein said band-pass filter permits transmission of light whose wavelength is within the selective wavelength band.

8. An incident-light fluorescence microscope comprising:

a transmission illuminating optical system having a light source for irradiating a sample with light emitted from the light source;

an objective lens;

an observation optical system located closer to the objective lens than the sample, said observation optical system including an incident-light fluorescence illuminating optical system;

a band-pass filter, a slit and a condenser lens which are arranged between the sample and the light source of the transmission illuminating optical system; and a modulator, a dichroic mirror, an absorption filter and an image forming lens which are arranged in the observation optical system and which are located further away from the sample than the objective lens;

wherein said incident-light fluorescence illuminating optical system includes an excitation light source and an excitation filter, and causes light emitted from the excitation light source to be reflected by the dichroic mirror of the observation optical system such that the reflected light is radiated to the sample;

wherein said modulator includes a phase film which permits transmission of a fluorescent wavelength emitted from the sample, and has a low-transmittance wavelength band in a wavelength region greater than the fluorescent wavelength; and wherein said band-pass filter permits transmission of light of the low-transmittance wavelength band.

9. An incident-light fluorescence microscope comprising:

a transmission illuminating optical system which includes a first optical member for receiving light emitted from a light source and extracting transmission light, said transmission illuminating system irradiating the transmission light onto a sample; and an observation optical system having an objective lens and a second optical member positioned closer to said objective lens than the sample, said observation optical system including an incident-light fluorescence illuminating optical system;

wherein said first optical member has a peak of transmittance at a wavelength greater than a fluorescent wavelength;

wherein said second optical member selectively modulates only a wavelength transmitted through said first optical member;

wherein said transmission illuminating optical system and said observation optical system operate in accordance with a pupil modulation microscopic method; and wherein said observation optical system comprises a pupil projecting lens, and said pupil projecting lens is arranged at an optically conjugate position with respect to an exit pupil plane of said objective lens.

10. A microscope according to claim 9, wherein said pupil modulation microscopic method according to which said observation optical system operates comprises a Hoffman modulation method.

11. A microscope according to claim 9, wherein said pupil modulation microscopic method according to which said observation optical system operates comprises a phase difference microscopic method.

12. A microscope according to claim 9, wherein said first optical member comprises a band-pass filter.

13. An incident-light fluorescence microscope comprising:

a transmission illuminating optical system including a transmission optical member on which light emitted by a light source is incident and which extracts transmission light, said transmission illuminating optical system irradiating a sample with the transmission light;

an observation optical system including an objective lens and an observation optical member positioned closer to the objective lens than the sample; and an incident-light fluorescence illuminating optical system, including an incident-light source, for guiding light emitted from the incident-light source to the sample through the observation optical system to thereby irradiate the sample with the light;

wherein said observation optical member has a predetermined wavelength band corresponding to wavelengths that are greater than a wavelength of fluorescence emitted from the sample upon irradiation by the incident-light source, the wavelength of fluorescence being greater than a wavelength of an excitation light beam and performing an observation different from fluorescence observation with the light whose wavelength band corresponds to said predetermined wavelength band; and wherein said transmission optical member permits selective transmission of light having a wavelength band corresponding to the predetermined wavelength band of the observation optical member.

14. A microscope according to claim 13, wherein:

said observation method different from fluorescence observation comprises a differential interference observation method;

said transmission illuminating optical system comprises a polarizer, a first Wollaston prism and a condenser lens;

a second Wollaston prism is interposed between the objective lens and the observation optical member of the observation optical system;

said transmission-optical member comprises a filter; and said observation optical member comprises a dichroic mirror, and said predetermined wavelength band is a band which permits transmission of only P-polarized light.

15. A microscope according to claim 13, wherein said transmission optical member comprises a band-pass filter.

16. A microscope according to claim 13, wherein said transmission optical member comprises a sharp cut filter.

17. A microscope according to claim 13, wherein said observation optical system includes an absorption filter.

18. A microscope according to claim 13, wherein said incident-light-fluorescence illuminating optical system includes an excitation filter.

19. A microscope according to claim 13, wherein:

said observation method different from fluorescence observation comprises a pupil modulation microscopic method;

said transmission illuminating optical system includes an illumination-side pupil modulation element and a condenser lens;

said observation optical member functions as an observation-side pupil modulation element and is arranged at a position which is further away from the sample than the objective lens.

20. A microscope according to claim 19, wherein said pupil modulation microscopic method comprises a Hoffman modulation method.

21. A microscope according to claim 20, wherein said transmission optical member comprises a band-pass filter and said observation optical member comprises a modulator.

22. A microscope according to claim 21, wherein:

said observation optical system further comprises an absorption filter and a dichroic mirror; and said band-pass filter has a spectral transmittance wavelength band which is within the predetermined wavelength region of the modulator.

23. A microscope according to claim 20, wherein:

said transmission illuminating optical system comprises a slit and a condenser lens; and said slit is arranged at an optically conjugate position with respect to a front focal plane of said condenser lens.

24. A microscope according to claim 19, wherein said pupil modulation microscopic method comprises a phase difference microscopic method, and said transmission optical member has a peak of transmittance at a wavelength greater than the fluorescent wavelengths used for fluorescence observation, and said observation optical member modulates selectively only a wavelength transmitted through the transmission optical member.

25. A microscope according to claim 24, wherein said observation optical system comprises a dichroic mirror and an absorption filter.

26. A microscope according to claim 25 wherein:

said transmission optical member comprises a band-pass filter and said observation optical member comprises a phase film; and said phase film has a transmittance which is as high as a transmittance of the dichroic mirror with respect to fluorescent light in a wavelength band corresponding to the fluorescent wavelengths used for fluorescence observation, and which is low with respect to the fluorescent light in a predetermined wavelength band corresponding to wavelengths greater than the fluorescent wavelengths used for fluorescence observation.

27. A microscope according to claim 24, wherein:

said transmission illuminating optical system comprises a slit and a condenser lens; and said slit is arranged at an optically conjugate position with respect to a front focal plane of said condenser lens.

* * * * *

UNITED STATES PATENT AND TRADEMARK OFFICE
CERTIFICATE OF CORRECTION

PATENT NO.    : 6,025,956
DATED         : February 15, 2000
INVENTOR(S)   : Takashi Nagano et al.

Page 1 of 1

It is certified that error appears in the above-identified patent and that said Letters Patent is hereby corrected as shown below:

Under Item [56], insert -- OTHER PUBLICATIONS

K. Spring; "Quantitative Imaging At Low Light Levels: Differential Interference Contrast and Flourescence Microscopy Without Significant Light Loss"; 1990; pp. 513-522; OPTICAL MICROSCOPY FOR BIOLOGY. --.

Signed and Sealed this

Twenty-fifth Day of September, 2001

Attest:

*Nicholas P. Godici*

NICHOLAS P. GODICI
*Attesting Officer*   Acting Director of the United States Patent and Trademark Office